United States Patent [19]

Longworth et al.

[11] Patent Number: 5,122,278

[45] Date of Patent: Jun. 16, 1992

[54] INHIBITION OF DEPOSITION IN AQUEOUS SYSTEMS

[75] Inventors: Stuart W. Longworth; Brian Greaves; John J. Bennison, all of Runcorn, England

[73] Assignee: W. R. Grace & Co.-Conn., New York, N.Y.

[21] Appl. No.: 558,925

[22] Filed: Jul. 26, 1990

[30] Foreign Application Priority Data

Sep. 6, 1989 [GB] United Kingdom ............... 8920137

[51] Int. Cl.$^5$ ........................... C02F 1/00; C02F 5/10
[52] U.S. Cl. ..................... 210/701; 210/699; 210/700; 252/180; 252/181
[58] Field of Search ............ 252/180, 181; 210/699, 210/700, 701

[56] References Cited

U.S. PATENT DOCUMENTS

| | | | |
|---|---|---|---|
| 3,879,283 | 4/1975 | Siegele | 210/58 |
| 3,898,037 | 8/1975 | Lange et al. | 252/389.62 |
| 4,331,792 | 5/1982 | Goretta et al. | 526/229 |
| 4,566,972 | 1/1986 | Bennison et al. | 252/180 |
| 4,600,524 | 7/1986 | Cuisia et al. | 252/180 |
| 4,711,725 | 12/1987 | Amick et al. | 252/180 |
| 4,719,082 | 1/1988 | Robinson | 210/701 |
| 4,752,443 | 6/1988 | Hoots et al. | 252/180 |
| 4,797,223 | 1/1989 | Amick et al. | 252/174.23 |
| 4,869,828 | 9/1989 | Hoots et al. | 210/701 |
| 4,877,535 | 10/1989 | Kobayashi et al. | 210/701 |
| 4,913,822 | 4/1990 | Chen et al. | 210/699 |
| 4,915,845 | 4/1990 | Leighton et al. | 210/701 |
| 4,919,821 | 4/1990 | Fong et al. | 252/180 |
| 4,923,634 | 5/1990 | Hoots et al. | 252/389.2 |
| 4,925,568 | 5/1990 | Morse | 252/180 |
| 4,929,425 | 5/1990 | Hoots et al. | 252/180 |

*Primary Examiner*—Willis, Jr. Prince
*Assistant Examiner*—J. Silberman
*Attorney, Agent, or Firm*—James P. Barr

[57] ABSTRACT

A method for treating an aqueous system is disclosed which comprises incorporating therein a water soluble organic sulphonate copolymer and an optionally N-substituted water soluble copolymer of acrylamide or methacrylamide and a copolymerizable monomer.

8 Claims, No Drawings

INHIBITION OF DEPOSITION IN AQUEOUS SYSTEMS

The present invention relates to the treatment of aqueous systems, and, more particularly, to both reducing or preventing the deposition of solid particles in an aqueous system, especially hard water, and also reducing or preventing the formation of scale.

It is well known that particles of solid matter including clay, silt, microbiological debris, ferric oxide and calcium carbonate deposit in aqueous systems and, in particular, in aqueous systems used in heat exchangers, cooling towers and associated equipment. Such deposits greatly retard the transfer of heat not only by limiting the circulation of water but by insulating it from the surface it is intended to cool. A further effect is that serious corrosion may occur under any deposits formed; such corrosion is minimised by keeping the metal surfaces clean. Apart from deposition of hardness salts and scale formation arising out of dissolved or suspended iron compounds, particulate matter is introduced into a cooling system, for example by the passage of large volumes of air through the cooling tower, and in the process the finely divided solids are effectively scrubbed out of the air.

A variety of different materials has been used as dispersants for the particulate material, especially low molecular weight polymers such as polycarboxylates eg polyacrylates.

While some of these materials are reasonably effective in soft-water systems, in hard-water systems, for example those which contain at least 300 ppm calcium hardness, they are considerably less effective. A further problem is that if one increases the amount of polycarboxylate to counteract the hardness of the water this results in an imbalance between the polycarboxylate and phosphonate which is normally present to inhibit scale. In other words, the effectiveness of the scale inhibitor is reduced.

In boiler water systems it is customary to use demineralized water as feed water because the thermal load is higher and the impurities present in the water thus have greater effect. Nevertheless it is impossible to remove all the impurities and, accordingly, polymer is still used in an attempt to disperse the iron content, in particular, of the boiler water. However such measures are only partially successful.

It has now been found, according to the present invention, that the use of a combination of a water-soluble organic sulphonate copolymer and an optionally N-substituted water-soluble copolymer of acrylamide or methacrylamide and any copolymerizable monomer in an aqueous system is very effective in both preventing deposition, or reducing the tendency of iron compounds and hardness salts to deposit, on the surfaces of the system. The present invention is particularly applicable to open and closed cooling systems, boiler systems and closed heating systems.

The sulphonate copolymer used in the present invention is generally derived from a sulphonate containing monomer and a carboxylic containing monomer. Preferred sulphonate copolymers which can be used in the present invention are vinyl addition type copolymers possessing recurring units of the formula:

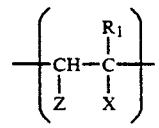

and

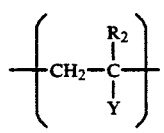

wherein $R_1$ represents hydrogen or lower alkyl, i.e. of 1 to 6 carbon atoms, preferably 1 to 4 carbon atoms, or —$CH_2COOH$, $R_2$ represents hydrogen or lower alkyl, X represents —COOH and Z represents hydrogen or —COOH or X and Z together represent —CO—O—CO, and Y represents —$SO_3H$, —$CH_2SO_3H$, —$C_6H_5SO_3H$ (para) or —$CONHQ$ $SO_3H$ in which Q represents —$C(R_3)(R_4)$—$(CH_2)x$—where x is 0,1 or 2 and $R_3$ and $R_4$, independently, represent hydrogen, phenyl, substituted phenyl, C 1–12 linear or branched alkyl or C3–12 cycloalkyl, especially methyl. Preferred such Y radicals include —$CONH$—$C(CH_3)(R_3)$—$CH_2$—$SO_3H$, especially where $R_3$ represents methyl, and —$CONHCH_2SO_3H$. Thus preferred sulphonate units are derived from 2-acrylamido-2-methyl-propane sulphonic acid, acrylamidomethyl sulphonic acid, styrene sulphonic acid and allyl sulphonic acid while the other units are preferably derived from (methy)acrylic acid or maleic acid.

The sulphonate copolymers are generally used in the form of an alkali metal, especially sodium or potassium, ammonium, or lower amine salt although the use of the free acids, zinc or other salts is not excluded.

The first units of the copolymer are generally derived from ethylenicaly unsaturated acids such as maleic or fumaric acid (or anhydride), acrylic acid and methacrylic acid. The second units of the copolymer are generally derived from ethylenically unsaturated monomers; these monomers may either contain the sulphonate group or this group can be introduced by sulphonation of the copolymer.

The molar proportion of the two types of recurring unit is generally from 5:95 to 95:5, more particularly from 25:75 to 75:25 and especially about 50:50. The polymers generally possess a molecular weight from 500 to 750,000 and in particular from 1,000 to 10,000 and especially from 4,000 to 6,000. It will be appreciated that if the molecular weight of the polymer is too high it tends to behave as a flocculating agent but this is not necessarily disadvantageous provided the flocculated material is sufficiently light to remain in suspension.

Preferred copolymers for use in the present invention include a copolymer of methacrylic acid and 2-acrylamido-2-methyl-propane sulphonic acid in the form of, in particular, the sodium salt, especially in a molar ratio of about 1:1 and having a molecular weight of about 5,000, a copolymer of styrene sulphonic acid and maleic acid in the form of, in particular, the sodium salt, especially in a molar ratio of about 3:1 and having a molecular weight of about 4,500, and a copolymer of allylsulphonic acid and maleic acid especially in a molar ratio of about 1:1 and having a molecular weight of about 3000.

The copolymers used in the present invention can be obtained from the monomers using the conventional polymerisation processes. The styrene sulphonate polymers can be prepared by sulphonating a copolymer or styrene and maleic anhydride with a sulphur trioxide - organic phosphorous compound (see, for example, U.S. Pat. No. 3,072,618).

The second copolymer used in the present invention is an optionally N-substituted copolymer of acrylamide or methacrylamide. The copolymerisable monomer will normally be carboxylic, typically acrylic or methacrylic acid, although an acrylic or methacrylic ester can also be used. Preferred such copolymers used in the present invention possess recurring units of the formula:

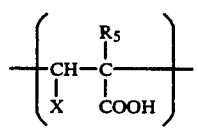

and

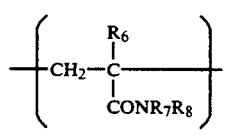

wherein $R_5$ and $R_6$ independently represent hydrogen or lower alkyl, X represents -COOH or hydrogen and $R_7$ and $R_8$ independently represent hydrogen, hydroxy, alkyl of 1 to 8 carbon atoms, especially 1 to 4 carbon toms, hydroxyalkyl, alkoxyalkyl or, in addition, one of $R_7$ and $R_8$ represents $NR_9R_{10}$ wherein $R_9$ and $R_{10}$ independently represent hydrogen, alkyl of 1 to 8 carbon atoms, especially 1 to 4 carbon atoms, hydroxyalkyl or alkoxyalkyl. Preferably —$CONR_7R_8$ represents —CON(OH) alkyl, especially where "alkyl" represents isopropyl or ethyl, —$CONH.NH_2$.

As with the sulphonate copolymers, these copolymers can be used either in the form of their free acids or in the form of salts such as those mentioned above.

The mole ratio of the two specified recurring units is important and the copolymer should generally be such as to contain at least 5 mole per cent of acid group-containing recurring units. Preferably, the mole ratio of the units is from 1:1 to 1:2 and optimum results are generally obtained with a mole ratio or about 1:1.

Preferred copolymers for use in the present invention include those derived from methacrylic and maleic acids, especially methacrylic acid, and, in particular, copolymers of methacrylic acid and acrylamide, typically with a mole ratio of the two monomer units of about 1:1.

When the second monomer is acrylic hydrazide the other monomer is preferably acrylamide or methacrylamide.

The molecular weight of the polymers is not particularly critical although it should not be too high since the polymer then tends to act as a flocculant (see above). A general range for the molecular weight, for example that obtained using intrinsic viscosity measurements, is 500 to 50,000, the preferred range being from 1,000 to 10,000.

These copolymers can generally be prepared by the usual free-radical type polymerisation conditions in aqueous media. Although it is possible to obtain certain acrylic acid copolymers by hydrolysing polyacrylamide, it will be appreciated that the copolymers used in the present invention derived from methacrylic acid cannot be prepared by partial hydrolysis in this way because, of course, hydrolysis of acrylamide will only give acrylic acid and not methacrylic acid.

The relative proportion of the two polymers can vary within fairly wide limits. In general the weight ratio will be from 10:1 to 1:10, especially 7:3 to 3:7 and in particular about 1:1.

It will be appreciated that although both copolymers must contain the specified recurring units, it is also possible to use polymers which contain other types of recurring units as well. If these other recurring units contain acid groups then these should be taken into account in determining the mole ratio of acid group containing units to the other units.

In general 1 to 200 ppm of polymer should be present in the aqueous system; preferred amounts are 2 to 50 ppm. It is desirable that the concentration of sulphonate copolymer is at least 2 to 3 ppm.

While the two copolymers can be dosed separately to the system it is generally more convenient to add them together, in which case they take the form of an aqueous solution. Accordingly the present invention also provides a composition suitable for addition to an aqueous system which comprises at least one water-soluble sulphonate copolymer and at least one water-soluble optionally N-substituted acrylamide or methacrylamide copolymer.

It is possible to incorporate into the composition, or add to the system, other water treatment materials especially scale inhibitors, such as phosphates and phosphonates, corrosion inhibitors and biocides, as well as oxygen scavengers, neutralising amines and filming amines which, as will be known by those skilled in the art, are effective particularly in boiler water systems and assist in preventing corrosion in condensate lines and the like.

The following Examples further illustrate the present invention.

EXAMPLE 1 to 3

An iron dispersancy test was carried out under the following conditions:

Test Conditions: Static Cylinder Test. 1000 ppm suspension of Ferric Oxide. pH: 8.5. 300 ppm Calcium hardness water. Duration of test: 4 hours.

Measurement criterion: transmission of light through suspension compared to an untreated suspension.

The additives used along with their dosages are shown below with the resulting efficiency measurements.

| EXAMPLE | ADDITIVE | DOSE LEVEL ppm | % EFFICIENCY |
|---|---|---|---|
| 1 | COMPOUND A | 2.5 | 14.0 |
| 2 | COMPOUND B | 2.5 | 9.3 |
| 3 | COMPOUND A & COMPOUND B | 2.5 2.5 | 83.1 |

KEY:
COMPOUND A - 1:1 Copolymer of methacrylic acid/2-acrylamido-2-methyl-propane sulphonic acid
COMPOUND B - 1:3 Copolymer of methacrylic acid/acrylamide By simple additive effects the mixture used in Example 3 would be expected to have an iron oxide dispersing efficiency of 23.3%. Unexpectedly it shows a vast improvement in having an efficiency of 83.1%.

What is claimed:

1. A method for treating an aqueous system to reduce or prevent the deposition of iron oxide particles in said system which comprises incorporating therein a combination of (i) a water soluble organic sulfonate copolymer having a molecular weight from 500 to 750,000, said organic sulfonate copolymer being a 1:1 copolymer of methacrylic acid and 2-acrylamido-2-methyl-propane sulphonic acid and (ii) a water soluble copolymer of methacrylic acid and acrylamide where said copolymer is a 1:3 copolymer of methacrylic acid and acrylamide having a molecular weight from 500 to 50,000, said copolymer (i) and copolymer (ii) being present in a ratio of from 7:3 to 3:7 in an amount effective to reduce or prevent the deposition of said iron oxide particles.

2. A method according to claim 1 in which said copolymer (ii) possesses a molecular weight from 1,000 to 10,000.

3. A method according to claim 1 wherein the sulfonate copolymer (i) is in the form of an alkali metal, ammonium or lower amine salt.

4. A method according to claim 1 in which the sulfonate copolymer (i) possesses a molecular weight from 1,000 to 10,000.

5. A method according to claim 1 in which each polymer is incorporated in the aqueous system in an amount from 2 to 50 ppm.

6. A method according to claim 1 in which at least one of a scale inhibitor, corrosion inhibitor, biocide, oxygen scavenger, neutralizing amine or filming amine is also incorporated into the aqueous system.

7. A method according to claim 1 in which the aqueous system is a cooling system, a boiler system or a closed heating system.

8. A composition for treating an aqueous system to reduce or prevent the deposition of iron oxide in said system comprising the combination in a weight ratio of from about 7:3 to 3:7 of (i) a water soluble organic sulfonate copolymer having a molecular weight from 500 to 750,000 said organic copolymer being a 1:1 copolymer of methacrylic acid and 2-acrylamido-2-methyl-propane sulphonic acid; and (ii) a water soluble copolymer of methacrylic acid and acrylamide where said copolymer is a 1:3 copolymer of methacrylic acid and acrylamide having a molecular weight from 500 to 50,000.

* * * * *